United States Patent [19]

Scholes

[11] Patent Number: 5,256,995

[45] Date of Patent: Oct. 26, 1993

[54] LOW HELIUM PERMEABILITY ATOMIC FREQUENCY STANDARD CELL AND METHOD FOR FORMING SAME

[75] Inventor: Addison B. Scholes, Muncie, Ind.

[73] Assignee: Ball Corporation, Muncie, Ind.

[21] Appl. No.: 914,394

[22] Filed: Jul. 17, 1992

[51] Int. Cl.$^5$ ............................................. H03L 7/26
[52] U.S. Cl. ..................................... 331/94.1; 331/3; 324/305
[58] Field of Search ................... 331/3, 94.1; 324/305

[56] References Cited

U.S. PATENT DOCUMENTS

| | | | |
|---|---|---|---|
| 3,242,423 | 3/1966 | Malnar | 331/3 |
| 3,248,666 | 4/1966 | Farmer | 331/94.1 |
| 3,510,758 | 5/1970 | Huggett | 331/94.1 |
| 3,577,069 | 5/1971 | Malnar | 331/94.1 |
| 3,675,067 | 7/1972 | Brun | 313/174 |
| 4,405,905 | 9/1983 | Busca et al. | 331/94.1 |
| 4,494,085 | 1/1985 | Goldberg | 331/94.1 |
| 4,596,962 | 6/1986 | Robinson | 331/3 |
| 4,661,782 | 4/1987 | Weidemann | 331/3 |

OTHER PUBLICATIONS

Thomas C. English and Ernst Jechart; Proc. 35th Ann. Freq Control Symposium, USAERADCOM, Ft. Monmouth, N.J., 07703, May 1991 "Development of a Sapphire Lamp for Use in Satellite-Borne Atomic Rubidium Clocks"; Eframtom Systems Corporation, Irvine, California 92715, pp. 637-645.

*Primary Examiner*—Siegfried H. Grimm
*Attorney, Agent, or Firm*—Gilbert E. Alberding

[57] ABSTRACT

An atomic frequency standard cell having low helium permeability includes first and second windows sealed by fusible annular gaskets to sealing surfaces defined by a tubular cylindrical body. One of the windows defines an opening, and a fill tube is sealed the window adjacent the opening by a tube gasket. The gaskets are made of a lower softening point glass such as borosilicate glass, and the body, windows and fill tube are formed of a higher softening point glass such as aluminosilicate glass. The assembly is sealed together by heating it to a temperature that causes the gaskets to fuse and seal the adjacent components together.

21 Claims, 3 Drawing Sheets

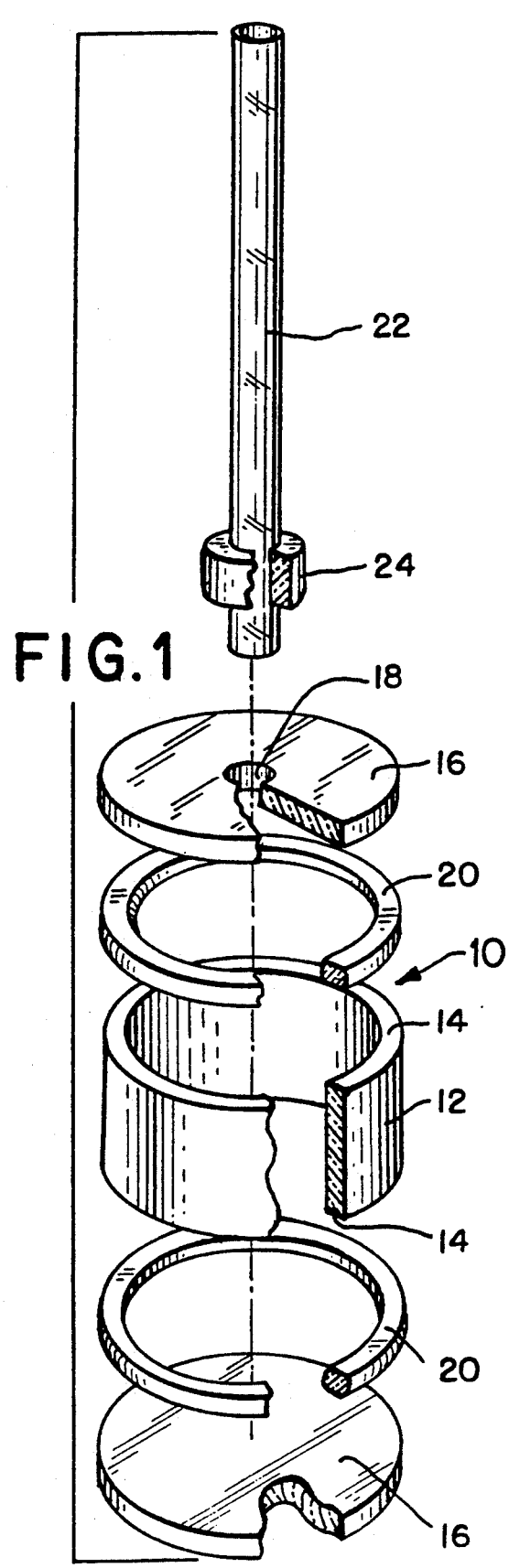
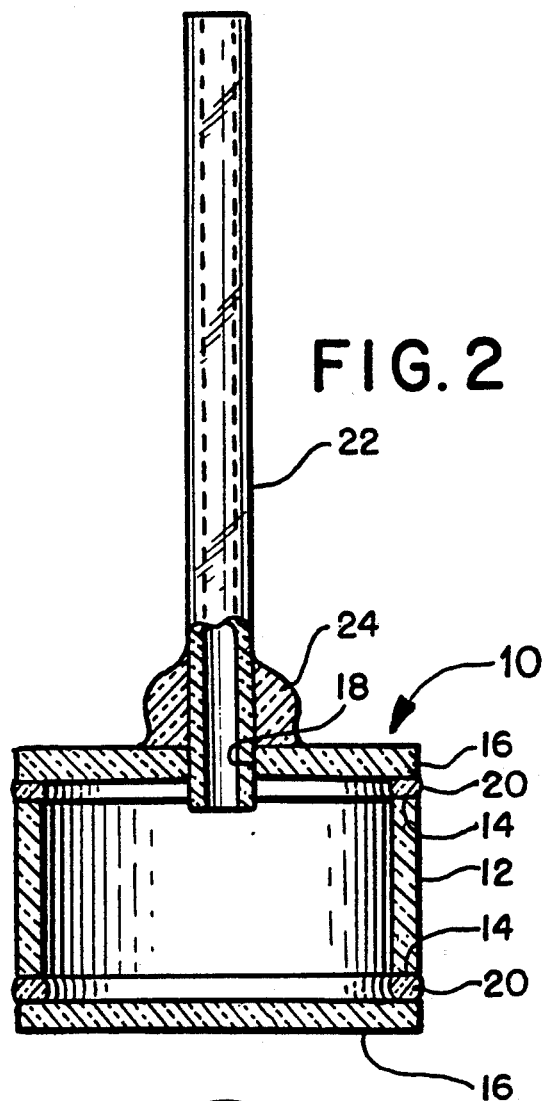
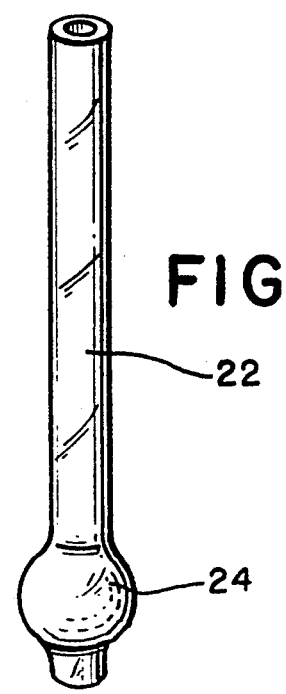

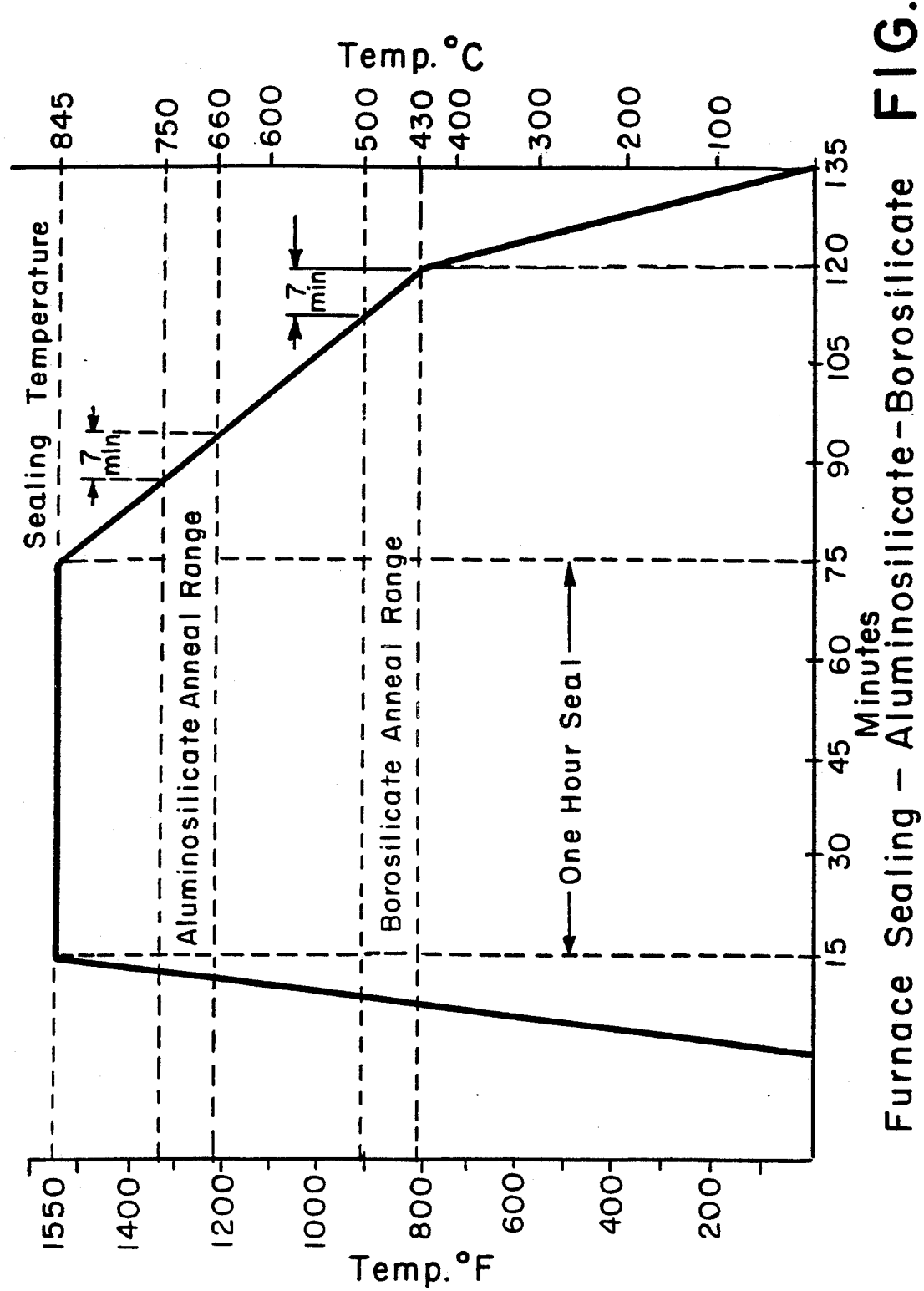

LOW HELIUM PERMEABILITY ATOMIC FREQUENCY STANDARD CELL AND METHOD FOR FORMING SAME

BACKGROUND OF THE INVENTION

This invention relates to atomic frequency standard cells such as cesium and rubidium cells, and to methods for fabricating such cells.

Optically pumped atomic frequency standards using alkali metal such as cesium and rubidium vapor have come into wide spread use as basic frequency standards. Weidemann U.S. Pat. No. 4,661,782 provides a general introduction to such frequency standards. Generally speaking, a gas cell is provided within a resonant microwave cavity. In a rubidium gas cell frequency standard, for example, microwave resonance in the rubidium is detected by measuring the absorption of a suitable optical radiation which is directed at the gas cell while the resonant cavity is excited by externally generated microwave radiation. The frequency of this microwave radiation is controlled according to the degree of absorption of the optical radiation.

When permanent gases such as helium, hydrogen, and nitrogen are present inside a reference cell containing the rubidium atoms, these gases act to shift (increase or decrease) the atomic reference frequency. (A "permanent gas" is a substance that exists completely in the vapor phase at all temperatures and pressures of interest.) The amount of the shift depends on the type of gas and the density of the gas in the cell and is therefore proportional to the partial pressure of the gas in the cell.

At 100° C. and below, glass is essentially impermeable to most gases. Helium and hydrogen are two exceptions to this statement. Since the helium atom has greater permeability than the hydrogen molecule, glass is much more permeable to helium than to hydrogen, and, helium that is normally present in the atmosphere in small amounts can slowly permeate a glass cell. (Hydrogen is also present in the atmosphere, but at ten times lower concentration than helium). This results in a helium concentration inside the cell that changes with time.

If the cell initially has no helium inside, then helium from the atmosphere will slowly pass through the glass and the helium density inside the cell will increase with time. The density increases to a final steady-state value which is equal to the density of helium in the atmosphere. At this point the permeation of helium through the glass stops because there is no longer any pressure differential across the glass walls of the cell. Typically this process takes years to stabilize, and the permeation rate is largest at the start.

The accumulation of helium inside the cell produces a frequency shift in the output frequency of the standard that varies with time. This behavior contributes to the overall frequency aging of the standard. Such aging is highly undesirable, because one of the reasons for using a rubidium frequency standard is that it exhibits low aging compared to less expensive devices, such as stand-alone crystal oscillators.

The rate at which helium accumulates in a cell (atoms/cc/sec) depends on the total permeation rate (atoms/sec) and the volume. The permeation rate is proportional to the total surface area of the cell. Generally speaking, as a cell is made smaller, its volume to surface area ratio decreases; i.e., the volume fills up faster with helium in a smaller cell because there is proportionally more surface area available for permeation. Thus, as cells are made smaller, the need for glass with lower helium permeability becomes more important.

Various approaches have been proposed for containing alkali metal vapor in a suitable cell, as discussed in the following U.S. Patents:

| U.S. Pat. No. | Inventor |
| --- | --- |
| 3,242,423 | L. Malnar |
| 3,248,666 | D. J. Farmer |
| 3,510,758 | G. R. Huggett |
| 3,577,069 | L. Malnar |
| 3,675,067 | H. Brun |
| 4,405,905 | Busca et al. |
| 4,494,085 | S. Goldberg |
| 4,569,962 | H. Robinson |

The cells described in the Malnar, Brun, Busca, and Huggett patents all rely on cells that are blown from a suitable glass. This approach brings with it a number of important disadvantages. First, skilled glass-blowers are needed to form such cells, and it is progressively more difficult to achieve uniform dimensions of the cells as they are made smaller. Furthermore, when gas cells are made smaller there is an increased importance in using low helium permeability glasses, and some low helium permeability glasses are difficult to work using glass-blowing techniques.

Another approach discussed in the Farmer patent is to eliminate the glass cell entirely and instead to supply windows in the metal walls of the microwave resonant cavity. The Farmer patent expressly recognizes the difficulty in manufacturing gas cells of glass or quartz to sufficiently close tolerances, and attempts to avoid these problems by eliminating the glass cell entirely. In the resonating cavity of Farmer, the windows 16, 17 are of glass, and they may be sealed to the resonator 10 by glass to metal seals using fusible rings attached to the cylindrical extensions 18, 20. The approach taken in the Farmer patent allows the alkali vapor gas to come into contact with the metal walls of the resonating cavity. Furthermore, it is not possible to replace the gas without simultaneously replacing the resonating cavity.

SUMMARY OF THE INVENTION

It is an object of this invention to provide a precisely dimensioned cell for an atomic frequency standard having low helium permeability, which can be manufactured without the use of specialized glass-blowing skills, which can be readily manufactured at a relatively low cost, and which can be filled with the desired gas in a conventional manner.

According to a first aspect of this invention, an atomic frequency standard cell is provided comprising a cell body defining first and second annular sealing surfaces. First and second windows are sealed to respective ones of the sealing surfaces to form a cell, and a fill tube communicates with an opening in the cell and is sealed thereto. The cell is shaped and configured as an atomic frequency standard cell, and the cell body and windows are formed of glasses having respective helium permeabilities less than about $K(T) = 1 \times 10^{-11}$ for $T = 100°$ C., where $K(T)$ is helium permeability expressed in cubic centimeters of helium per second at 760 torr, 25° C. for 1 cm$^2$ of glass having a thickness of 1 mm when a helium partial pressure difference of 1 torr is applied across the glass. This cell preferably has a volume less than 60 cubic centimeters.

According to a second aspect of this invention, a method is provided for forming an atomic frequency standard cell having low helium permeability. First and second windows and a cell body are provided, the body defining first and second annular sealing surfaces, and one of the windows and the body defining an opening. The windows and the body are all formed of glasses having respective helium permeabilities less than $K(T) = 1 \times 10^{-11}$ for T equals 100° C. The first and second windows are sealed to the respective sealing surfaces of the body to form a cell having a volume no greater than 60 cubic centimeters. A tube is sealed to the cell adjacent to the opening to form a fill tube for the cell.

Preferably, the body, windows and tube comprise aluminosilicate glass, and annular fusible gaskets comprising borosilicate glasses are positioned between the windows and the respective annular sealing surfaces. The sealing step preferably comprises a step of heating the body and the windows to a temperature of no more than about 850° C. for a time sufficient to fuse the gaskets and seal the windows to the body.

The invention itself, together with further objects and attendant advantages, will best be understood by reference to the following detailed description taken in conjunction with the accompanying drawings.

BRIEF DESCRIPTION OF THE DRAWINGS

FIG. 1 is an exploded perspective view of the components of an atomic frequency standard cell which incorporates a presently preferred embodiment of this invention, prior to fabrication.

FIG. 2 is a cross-sectional view of the cell of FIG. 1 at the completion of fabrication.

FIG. 5 is a perspective view of selected components of the cell of FIG. 2 at a second intermediate stage in fabrication.

FIG. 7 is a graph showing a preferred heating cycle used in the fabrication of the cell of FIG. 2.

DETAILED DESCRIPTION OF THE PRESENTLY PREFERRED EMBODIMENTS

Figure 3:
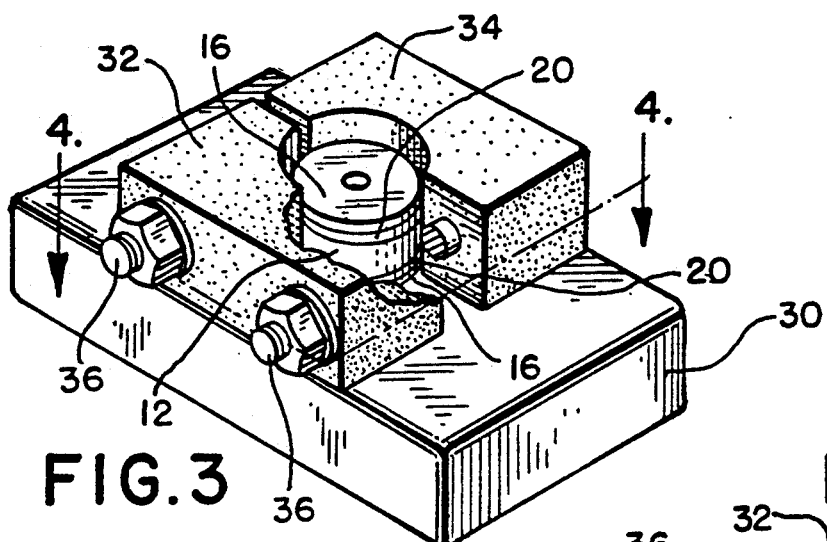
FIG. 3 is a perspective view of the cell of FIG. 2 at a first intermediate stage of fabrication.

Turning now to the drawings, FIGS. 1 and 2 show exploded perspective and cross sectional views of an atomic frequency standard cell 10 which incorporates a presently preferred embodiment of this invention. The cell 10 includes a cylindrical, tubular body 12 which defines spaced, parallel, annular sealing surfaces 14. The cell 10 also includes first and second windows 16, one of which defines a central opening 18. Annular, fusible window gaskets 20 are positioned between the sealing surfaces 14 and the windows 16, and a fill tube 22 is positioned in the opening 18. A fusible tubular gasket 24 is positioned around the fill tube 22 to seal the fill tube 22 to the adjacent window 16.

The various component elements of the cell 10 can readily be manufactured as discrete components. For example, the fill tube 22, the body 12 and the gaskets 20, 24 can be cut from glass tubes. The materials chosen for the elements of the cell 10 are carefully selected to have the desired thermal and helium permeability characteristics. In particular, the gaskets 20, 24 are formed of materials having a lower softening temperature than that of the body 12, the windows 16 and the tube 22 such that when the assembled cell 10 is heated to the proper temperature, the gaskets 20, 24 fuse to seal the windows 16 to the body 12 and the fill tube 22 to the window 16, and yet the body 12, the windows 16 and the tube 22 do not substantially alter their shape.

Figure 4:
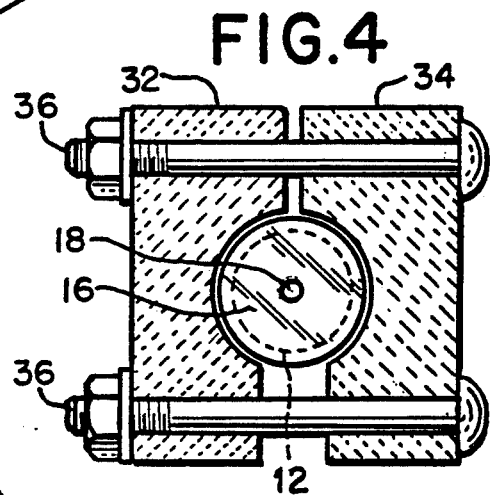
FIG. 4 is a cross-sectional view taken along line 4—4 of FIG. 3.
Figure 6:
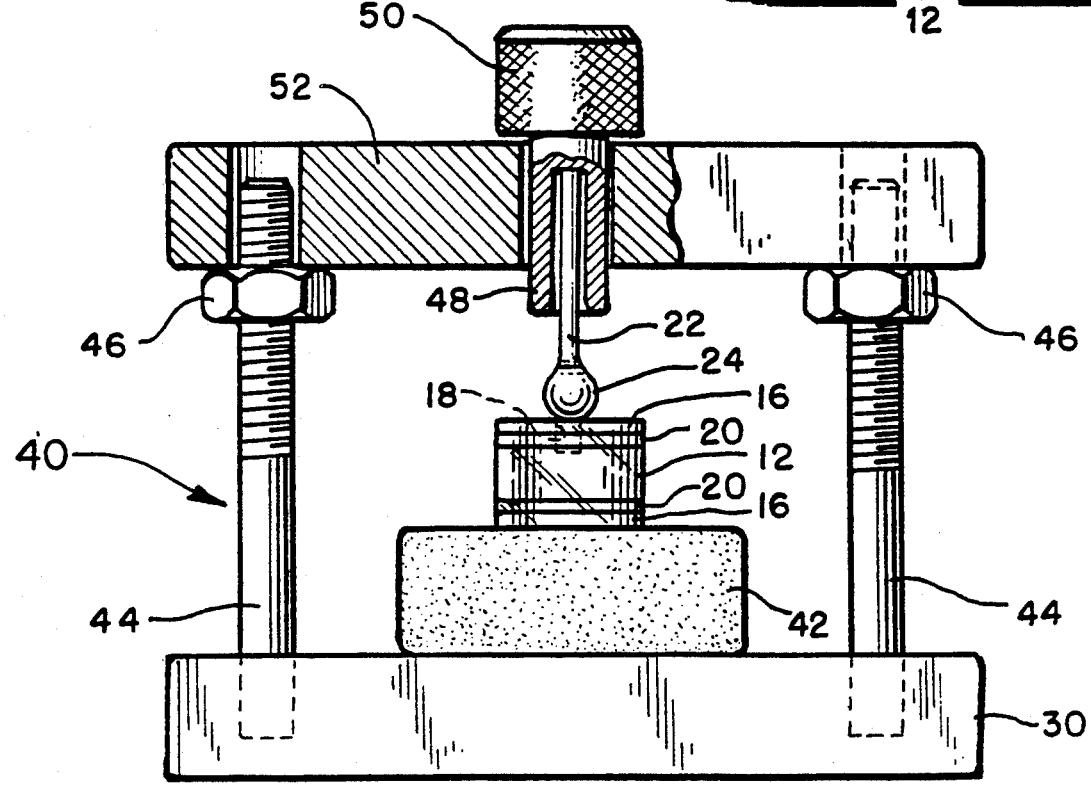
FIG. 6 is a side view in partial section of the cell of FIG. 2 at a third intermediate stage in fabrication.

The preferred method for forming the cell 10 is illustrated in FIGS. 3–6. As shown in FIGS. 3 and 4, a first step in this method is to assemble the windows 16, window gaskets 20 and body 12 in a stack on a support element 30. The assembled components are placed within a jig 32, 34 which is loosely held together by fasteners 36. The support surface 30 is oriented horizontally such that the windows 16 are oriented horizontally. The jig 32, 34 can be pressed together to position the body 12, the windows 16 and the window gaskets 20 concentric with respect to one another. The jig 32, 34 is then moved out of contact with the assembled elements of the cell 10. The assembly shown in FIGS. 3 and 4 is then brought to a suitable temperature to cause the window gaskets 20 to fuse and thereby to seal the windows 16 to the body 12. The sealed assembly is then allowed to cool at a controlled rate to anneal the assembly.

The next step in the fabrication of the cell 10 is to place the tube gasket 24 on the fill tube 22 and to support the fill tube in a horizontal orientation, with the tube gasket 24 spaced from the end of the fill tube 22 by a small amount (1 mm in this example). Then the combination of the fill tube 22 and the assembled tube gasket 24 is heated as described above to cause the tube gasket 24 to fuse to form a bead like shape at one end of the fill tube 22. As shown in FIG. 5, a small length (approximately ½ mm in this embodiment) of the fill tube 22 protrudes beyond the fused tube gasket 24.

The third step in the preferred method for forming the cell 10 is to place the body 12 with the sealed windows 16 in place in a fixture 40 which includes a support surface 42. The fixture 40 supports two vertical supports 44 which are provided with adjustable flanges 46. Then the fill tube 22 is positioned with the end of the fill tube 22 in the opening 18 and the fused tube gasket 24 in contact with the adjacent window 16. The upper end of the fill tube 22 is positioned within a riser 48 that defines a head 50. The riser 48 is freely slidable in an opening in a beam 52 which rests on the flanges 46. The fixture 40 is adjusted such that the head 50 of the riser 48 protrudes approximately 1 mm above the beam 52. The weight of the riser 48 presses the fill tube 22 downwardly, thereby pressing the fused tube gasket 24 into contact with the window 16. This assembly is then heated as described above, thereby softening the tube gasket 24. Once the tube gasket 24 is softened, the weight of the riser 48 pushes the fill tube 24 downwardly by about 1 mm and thereby presses the fused tube gasket 24 into sealing contact with the adjacent window 16, to produce the finished cell 10 of FIG. 2.

As pointed out above, it is particularly important when constructing a small frequency standard cell of the type described above to maintain helium permeability of the walls of the cell at an adequately low level.

The total amount, q, of helium gas permeating a thin glass wall of area A and thickness d in a time t is given by $$q(T,t) = K(T) \cdot (A/d) \cdot \delta p \cdot t, \quad (1)$$

where $K(T)$ is the helium permeation constant for the glass at temperature T, and $\delta p$ is the pressure differential of helium across the wall. Using this formula, it can be shown that the instantaneous rate of pressure rise inside a closed volume, V, due to helium permeation through the walls, is $$dp/dt = \delta p/\tau, \quad (2)$$

where $$\tau = 0.392 \cdot V \cdot d / [K(T) \cdot A \cdot T]. \quad (3)$$

Here, p is in torr; K is the helium permeation constant which is the permeability in cc of helium per second at NTP (760 torr, 25° C.) for 1 cm² of glass having a thickness of 1 mm when a helium partial pressure difference of 1 torr is applied across the glass; A is the total surface area of glass in cm²; V is in cc; d is in mm; and T is the cell temperature in degrees Kelvin.

The relationship between the shift $\delta f$ in the output frequency of the standard due to helium in the cell and the partial pressure of helium inside the cell is given by $$y = C_1 \cdot p, \quad (4)$$

where $$C_1 \approx +0.80 \times 10^{-7}/\text{torr} @ 100° \text{C}. \quad (5)$$

and y = fractional frequency offset due to helium = $\delta f/f$.

Combining Eqs. (2) and (4), we obtain the frequency aging, $$R(t) = dy(t)/dt = [C_1 \cdot \delta p_o/\tau] \cdot e^{-t/\tau} \quad (6)$$

where $\delta p_o$ is the initial value of the helium partial pressure difference across the cell wall, which is positive if the helium pressure outside the cell is greater than that inside.

The result obtained in Eq. (6) shows that if the cell is placed in an environment where the helium partial pressure is constant, then the aging rate at t=O, $R_o$, is given by $$R_o = R(O) = C_1 \cdot \delta p_o/\tau, \quad (7)$$

and the aging rate thereafter decreases exponentially with time constant $\tau$. Typically, $\tau$ is a long time, on the order of years. For this reason the aging when the unit is new is of primary interest, which is also when the aging rate is greatest. In this case, t << $\tau$ and dy/dt is approximately equal to the value at t=0, namely $R_o$.

Combining Eq. (3), (5) and (7), we obtain $$R_o = 2.04 \times 10^{-7} \cdot [\delta p_o \cdot K(T) \cdot A \cdot T]/(V \cdot d). \quad (8)$$

If the cell contains no helium at the time of manufacture, and the frequency standard is operated at sea level in the earth's atmosphere, then $\delta p = 4.0 \times 10^{-3}$ torr and the above equation becomes $$R_o = 8.16 \times 10^{-10} \cdot [K(T) \cdot A \cdot T]/(V \cdot d). \quad (9)$$

For a given acceptable aging rate, this equation can be used to set an upper limit on the permeation constant as a function of the surface-area-to-volume ratio and the glass thickness:

$$K(T) \leq (1.23 \times 10^9 \cdot R_o/T) \cdot d/(A/V). \quad (10)$$

As the cell gets smaller, the surface-area-to-volume ratio increases and it is clear from this equation that the largest acceptable value of the permeation constant decreases.

Small military rubidium frequency standards having a claimed aging performance of $1 \times 10^{-22}$ per month ($3.8 \times 10^{-18}$/sec) are presently available. Since there is more than one source of aging in a rubidium frequency standard ("RFS"), a good rule of thumb is, if possible, to limit each contributor to approximately one-tenth of the total desired aging. For this reason, $R_o = 3.8 \times 10^{-19}$/sec is a reasonable value to use in the above equations.

To be competitive, a military RFS typically either uses a cell that operates at high temperature ($\approx 100°$ C.), or else uses a thermoelectric cooler to maintain a lower cell temperature when higher ambient temperatures are encountered. The latter approach is more complicated and expensive, and therefore the former approach of a cell able to operate at high temperatures is desirable. For this reason, a cell operating temperature of 100° C. is assumed in the following analysis.

Using the above values of $R_o$ and T, Eq. (10) becomes $$K(T) \leq 1.25 \times 10^{-12} \cdot d/(A/V). \quad (11)$$

As an example, we may take a cylindrical cell of circular cross section (inside dimensions of radius R and length L) for which $A = 2\pi R(R+L)$ and $V = \pi R^2 L$. In this case, $$A/V = 2(1/L + 1/R), \text{ cylindrical cell.} \quad (12)$$

In the case of a small cylindrical cell with L=0.7 cm and R=0.55 cm, A/V=6.5 and from Eq. (11) we have that $$K(T) \leq 1.9 \times 10^{-13} \cdot d. \quad (13)$$

For most practical cells, $d \approx 1$ mm. In this case, $$K(T) \leq 1.9 \times 10^{-13}, d=1 \text{ mm}. \quad (14)$$

Aluminosilicate glass such as Corning 1720 glass has a low enough helium permeation constant to satisfy the requirement of Eq. (14), and it satisfies the requirements by more than two orders of magnitude; since other aluminosilicate glasses are expected to have approximately the same helium permeation constant as Corning 1720, they are also expected to be suitable for use in small cells.

Similar considerations also apply for cells having other geometrical shapes. The general case can be treated using Eq. (11) which gives the maximum allowable value of the permeation constant as a function of (A/V) and d. Conversely, for a given glass and permeation constant, Eq. (11) can be used to determine the smallest allowable value of (A/V)/d.

Operation of an RFS in a helium-enriched and/or hydrogen-enriched atmosphere would impose an even more stringent condition on the maximum allowable value of permeation constant for a given value of (A/V).

For the reasons set out above, the preferred material for the body 12, the window 16 and the fill tube 22 is an aluminosilicate glass such as Corning 1720 or 1724. The preferred material for the gaskets 20, 24 is a borosilicate glass such as Corning 7052. Borosilicate glass has a lower softening point than does aluminosilicate glass, and thus is well suited for forming the sealing gaskets 20, 24. Additionally, the coefficients of thermal expansion of these two materials are closely matched. Aluminosilicate glass has a suitably low helium permeability constant K(T) (less than $2 \times 10^{-13}$ for T equals 100° C.). Borosilicate glass, though it has a higher helium permeability constant, makes up only a small fraction of the total area of the cell 10.

Table 1 provides presently preferred dimensions and materials for the components of the cell 10, which has a volume of about 0.66 cc. In Table 1 all dimensions are in inches, and the dimensions for the gaskets 20, 24 are taken after fabrication of the cell 10 has been completed.

TABLE 1

| Element | Height | Wall Thickness | ID | OD | Material* |
|---|---|---|---|---|---|
| body 12 | .220 | .040 | — | .52 | 1 |
| window 16 | .040 | — | — | .52 | 1 |
| fill tube 22 | 2.0 | — | .040 | .080 | 1 |
| window gasket 20 | .030 | .040 | — | .52 | 2 |
| fill tube gasket 24 | .060 | — | .080 | .19 | 2 |

*Material 1 is an aluminosilicate glass such as Corning 1724; Material 2 is a borosilicate glass such as Corning 7052 or 7056.

In order to minimize distortion of the window 16 adjacent the fill tube 22, the heating cycle is preferably conducted at a relatively low temperature of less than 850° C. and preferably about 845° C. for about one hour. FIG. 7 defines the preferred heating cycle used for the three sealing operations described above. As shown in FIG. 7, the cooling rate is preferably controlled to allow at least seven minutes in the anneal range for aluminosilicate glass (660°–750° C.) and at least seven minutes in the anneal range for borosilicate glass (430°–500° C.) Vibration is preferably minimized during the heating cycle, and a travelling belt furnace can be used The surfaces to be sealed should be clean and free of particle contamination.

The preferred material for the support surfaces 30, 42, the jig 32, 34, and the beam 52 is a refractory material such as that sold under the trade name Lava by Minnesota Mining & Manufacturing. The remaining components of the fixture 40 can be formed of stainless steel. Of course, all of these details of construction are provided merely to define the best mode presently contemplated by the inventor, and these details are not intended to limit the scope of this invention.

After the cell has been fabricated as discussed above, it can be filled in the conventional manner with a gas comprising an alkali metal vapor such as cesium or rubidium vapor. The fill tube 22 can then be sealed in the conventional manner to close the cell 10.

The cell 10 and the method for forming the cell 10 described above provide a number of important advantages. First, all of the component parts can be manufactured separately in automatic or semi-automatic operations. The cell itself can be manufactured in a low cost, repeatable manner without the use of specialized glass-blowing skills Because the body of the cell functions as a spacer which defines the separation between the windows and therefore the optical path length of the cell, the separation between the windows can be precisely controlled at a desired value simply by properly dimensioning the component parts. The fill tube allows the cell to be filled in the conventional manner without glass blowing skills, and the sealed cell provides low helium permeability and is well suited for a small volume cell. The windows are flat and free of thermal deformation, and much of the window that receives the fill tube is itself unobstructed. This invention is particularly useful in small volume cells having a volume less than 60 cc, and preferably less than 10 cc.

Of course, it should be understood that a wide range of changes and modifications can be made to the preferred embodiments described above. Alternate materials can be substituted for the particular glasses disclosed above, and the cell 10 can be shaped as desired. For example, cross-sectional shapes other than the circular shape shown can readily be obtained. If desired, the fill tube can be mounted in an opening in the body as opposed to one of the windows, and the fill tube may not protrude into the opening. Also, pressed sintered parts made from glass powder and a suitable binder may be used.

It is therefore intended that the foregoing detailed description be regarded illustrative rather than limiting, and that it be understood that it is the following claims, including all equivalents, which are intended to define the scope of this invention.

I claim:

1. A method for forming an atomic frequency standard cell with low helium permeability, said method comprising the following steps:

a) providing first and second windows and a cell body, said body defining first and second annular sealing surfaces, one of the windows and the body defining an opening, said windows and body all formed of glasses having respective helium permeabilities less than $K(T)=1 \times 10^{-11}$ for T=100° C., where K(T) is helium permeability expressed in cc's of helium per second at 760 torr and 25° C. for 1 cm$^2$ of glass having a thickness of 1 mm when a helium partial pressure difference of 1 torr is applied across the glass;

b) providing a tube sized to fit adjacent the opening;

c) sealing the first and second windows to the respective sealing surfaces of the body to form a cell having a volume no greater than about 60 cc; and d) sealing the tube to the cell adjacent the opening to form a fill tube for the cell.

2. The method of claim 1 wherein step c) comprises the following steps:

c1) positioning first and second annular, fusible gaskets between the respective windows and sealing surfaces; and c2) heating the gaskets to fuse the gaskets to the body and the respective windows, thereby sealing the windows to the body.

3. The method of claim 2 wherein step d) comprises the following steps:

d1) positioning a third annular, fusible gasket around the tube adjacent to the opening; and d2) heating the third gasket to fuse the gasket to said one of the windows and the body, thereby sealing the tube in place.

4. The method of claim 1 wherein the body, the windows, and the tube comprise aluminosilicate glass.

5. The method of claim 2 wherein the body, the windows, and the tube comprise aluminosilicate glass and wherein the gaskets comprise borosilicate glass.

6. The method of claim 5 wherein the heating step c2) comprises the step of heating the body, the windows and the gaskets to a temperature no more than about 850° C. for a time sufficient to seal the windows to the body.

7. The method of claim 1 wherein the body provided in step a) defines spaced, parallel sealing surfaces separated by a precisely controlled dimension.

8. The method of claim 7 wherein the body defined in step a) is cylindrical in shape, and wherein the opening is formed in one of the windows.

9. The method in claim 1 wherein the tube provided in step b) is sized to fit into the opening.

10. The method of claim 3 wherein step d1) comprises the following steps:
   d1a) fusing the third gasket to one end of the tube such that a portion of said one end of the tube protrudes beyond the fused third gasket; and
   d1b) positioning said one end of the tube in the opening with the fused third gasket in contact with the cell adjacent the opening.

11. An atomic frequency standard cell comprising:
   a cell body defining first and second annular sealing surfaces;
   first and second windows, each sealed to a respective one of the sealing surfaces to form a cell; and
   a fill tube communicating with an opening in the cell and sealed thereto;
   said cell shaped and configured as an atomic frequency standard cell;
   said cell body and windows formed of glasses having respective helium permeabilities less than about $K(T) = 1 \times 10^{-11}$ for $T = 100°$ C., where $K(T)$ is helium permeability expressed in cc's of helium per second at 760 torr, 25° C. for 1 cm$^2$ of glass having a thickness of 1 mm when a helium partial pressure difference of 1 torr is applied across the glass;
   said cell having a volume less than 60 cc.

12. The cell of claim 11 further comprising:
   first and second annular, fusible gaskets fused between the respective windows and sealing surfaces.

13. The cell of claim 12 further comprising:
   a third annular, fusible gasket fused to the fill tube and the cell around the opening.

14. The cell of claim 11 wherein the body, the windows, and the tube comprise aluminosilicate glass.

15. The cell of claim 12 wherein the body, the windows, and the tube comprise aluminosilicate glass and wherein the gaskets comprise borosilicate glass.

16. The cell of claim 11 wherein the sealing surfaces on the body are parallel and separated by a precisely controlled dimension.

17. The cell of claim 11 wherein the cell body is cylindrical in shape, and wherein the opening is formed in one of the windows.

18. The cell of claim 11 wherein the cell body and windows are formed of materials having respective helium permeability constants $K(T)$ less than $2 \times 10^{-13}$ for $T = 100°$ C.

19. The cell of claim 11 wherein the cell contains a gas mixture comprising an alkali metal vapor.

20. The cell of claim 19 wherein the alkali metal vapor comprises rubidium.

21. The cell of claim 11 wherein the fill tube is dimensioned to pass through the opening.

* * * * *